(12) United States Patent  (10) Patent No.: US 8,087,612 B2
Park  (45) Date of Patent: Jan. 3, 2012

(54) AIRCRAFT SEAT SUPPORTING STRUCTURE

(75) Inventor: James William Park, London (GB)

(73) Assignee: James Park Associates Limited, London (GB)

( * ) Notice: Subject to any disclaimer, the term of this patent is extended or adjusted under 35 U.S.C. 154(b) by 703 days.

(21) Appl. No.: 11/791,012

(22) PCT Filed: Dec. 2, 2005

(86) PCT No.: PCT/GB2005/004615
§ 371 (c)(1),
(2), (4) Date: Mar. 11, 2008

(87) PCT Pub. No.: WO2006/059118

PCT Pub. Date: Jun. 6, 2008

(65) Prior Publication Data
US 2009/0065643 A1 Mar. 12, 2009

(30) Foreign Application Priority Data

Dec. 2, 2004 (GB) .................................... 0426527

(51) Int. Cl.
B64D 11/06 (2006.01)
(52) U.S. Cl. .................. 244/118.5; 297/344.1
(58) Field of Classification Search ............... 244/118.6, 244/122 R, 118.5; 297/216.1, 344.1, 344.14
See application file for complete search history.

(56) References Cited

U.S. PATENT DOCUMENTS

| 4,630,864 | A | * | 12/1986 | Toll ................................ 297/232 |
| 5,482,351 | A |  | 1/1996 | Young et al. |
| 5,522,182 | A | * | 6/1996 | Rogers .............................. 52/9 |
| 6,276,635 | B1 | * | 8/2001 | Ferry et al. ................. 244/118.6 |
| 2004/0232283 | A1 |  | 11/2004 | Ferry et al. |

FOREIGN PATENT DOCUMENTS

| DE | 102 24 048 A 1 | 12/2003 |
| DE | 20 2004 008 069 U1 | 7/2004 |
| WO | WO 03/013903 A1 | 2/2003 |

OTHER PUBLICATIONS

International Search Report of corresponding International Application No. PCT/GB2005/004615 dated Apr. 24, 2006 (English Text).
Written Opinion of the International Searching Authority of corresponding International Application No. PCT/GB2005/004615 dated Apr. 24, 2006 (English Text).

* cited by examiner

Primary Examiner — Tien Dinh
Assistant Examiner — Michael Kreiner
(74) Attorney, Agent, or Firm — Fay Sharpe LLP

(57) ABSTRACT

A support structure for an aircraft seat includes load bearing spaced side members, each having elements for securing a seat for continuous movement between first and second positions, and a ground engaging portion. The structure further includes a stiffening web extending between the side members. The side members and the stiffening web substantially define a hollow box section of at least four sides to stiffen the side members, at least in the regions beneath the element securing the seat. The support structure allows other material than the conventional steel or aluminum constructions to be used for the support frame. For example, substantially all off the structural strength of the support may be provided by fiber reinforced composite materials.

18 Claims, 4 Drawing Sheets

AIRCRAFT SEAT SUPPORTING STRUCTURE

BACKGROUND

This invention relates to aircraft seating and seating arrangements. The invention is particularly, but not exclusively, applicable to seating for commercial aircraft.

It is becoming increasingly necessary for airlines to install a seat in a commercial aircraft that converts into a bed, at least in first class on long haul flights. The conflicting commercial considerations are the provision of a good service, on the one hand, and the pressure to maintain cabin seating density and weight considerations, on the other. Thus, it has become the goal of the seat designer to make as much use of as little space and weight as possible while providing the necessary level of space and comfort expected in first and business class.

WO 03/013903 discloses a seat unit for an aircraft that can be converted into a bed. The seat unit comprises a supporting structure for attaching a seat to the floor of the aircraft. The supporting structure comprises a load bearing aerospace-grade steel subframe which is clad with one or more shaped composite panels. The steel subframe provides a structurally strong point of attachment for the passenger seat and other components of the seat unit.

The use of a steel subframe in constructing sleeper/seat units for aircraft can be understood from the need to comply with stringent safety regulations aimed at ensuring that a seat unit can withstand the foreseeable loads and stresses which may arise during a crash of the aircraft. Due to these stringent safety regulations, there is thus an apparent prejudice in the field of aircraft seat construction against using other materials for the structural component of a seat.

BRIEF SUMMARY

Embodiments of the invention are based on the realisation that structural frames having sufficient structural performance to comply with the stringent aviation safety regulations can be obtained by careful design of a structure. Using composite materials for the structural, load bearing, frame or support structure of the aircraft seat results in significant weight savings as compared with prior metal subframe designs. Any reference to composite or fibre-reinforced composite materials herein is understood to refer to any material comprising a reinforcing material such as carbon or glass fibres embedded in a matrix of a secondary material, usually a polymer. The reference to composite or fibre-reinforced composite materials also includes materials which are laminates of layers of composite materials and/or core materials such as a honeycomb material, for example, an aluminium or plastics honeycomb core.

In one embodiment the structural frame comprises side members spaced apart by a cross member which is designed to distribute any load or shear forces over a relatively large area at the interface between the side members and the cross members. Additional structural stability is achieved by integrally including additional elements forming a backshell member within the structural frame.

BRIEF DESCRIPTION OF THE DRAWINGS

The invention can be put into practice in various ways, some of which will now be described by way of example with reference to the accompanying drawings in which.

DETAILED DESCRIPTION

Figure 1:
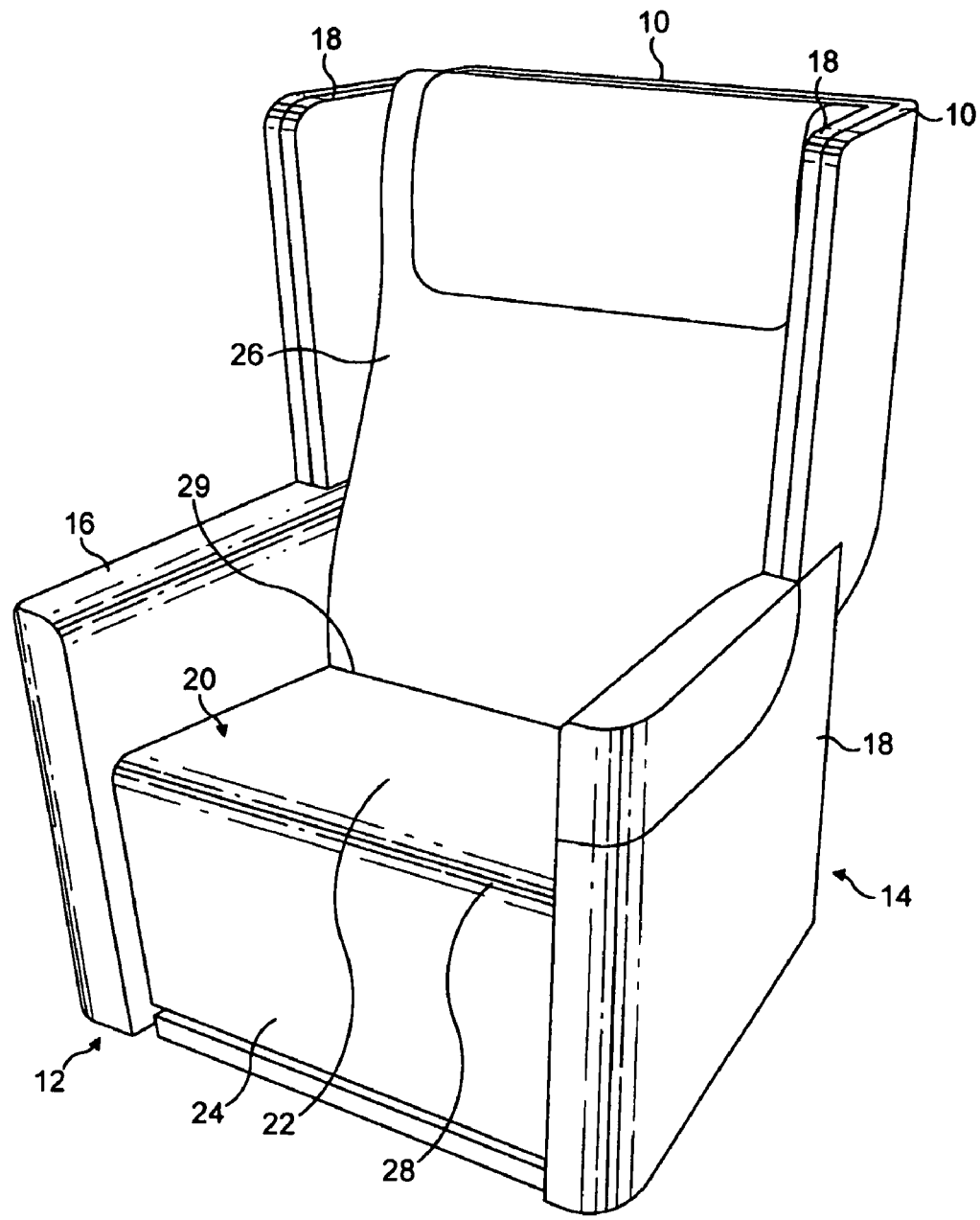
FIG. 1 is a perspective view of an embodiment of a seat for an aircraft.

Referring to FIG. 1, a seat unit for an aircraft cabin comprises a back shell 10 and load bearing side frame members 12 and 14, each defining an integral arm 16. In this embodiment, the side members and backshell each comprise decorative cladding 18 that covers the rigid structural frame members 12 and 14 that support the constituent parts of a seat 20. The parts of the seat are a seat base 22, a leg rest 24 and a back rest 26. The seat base 22, in this embodiment, is arranged to slide longitudinally and/or to be adjustable for seat base angle, according to passenger preference, by means of slots formed in each of the frame members 12/14 in which the parts of the seat ride. Likewise, the seat back rest 26 is adjustable as part of a seat configuration.

In this case, conventional manual or electrically motorised slide mechanisms can be used, as are known from conventional seats for this type of application. The leg rest 24 is essentially conventional in function, being either manually, pneumatically or electrically deployable. It is pivotably mounted at a point 28 at or near the front of the seat base 20.

It will be appreciated that the components of the seat unit are covered in suitable cushioning and material in appropriate areas, such as the arms, seat base and seat back. These are omitted from the drawings showing the component parts for the sake of clarity.

The seat back 26 is mounted to pivot at a point 29 about or near its junction with the seat base 22 to fold forward on top of the seat base 22. As with the seat base, the seat back 26 is mounted for slidable movement between the two side frame members 12 and 14. The leg rest 24 is mounted on the front seat base 22, as described. The side frame members 12 and 14 are spaced by one, or more than one, cross member both to provide rigidity for the structure and to mount components such as the actuating mechanisms for movement of the seat components that have to be supported between the side frames 12 and 14.

Figure 2:
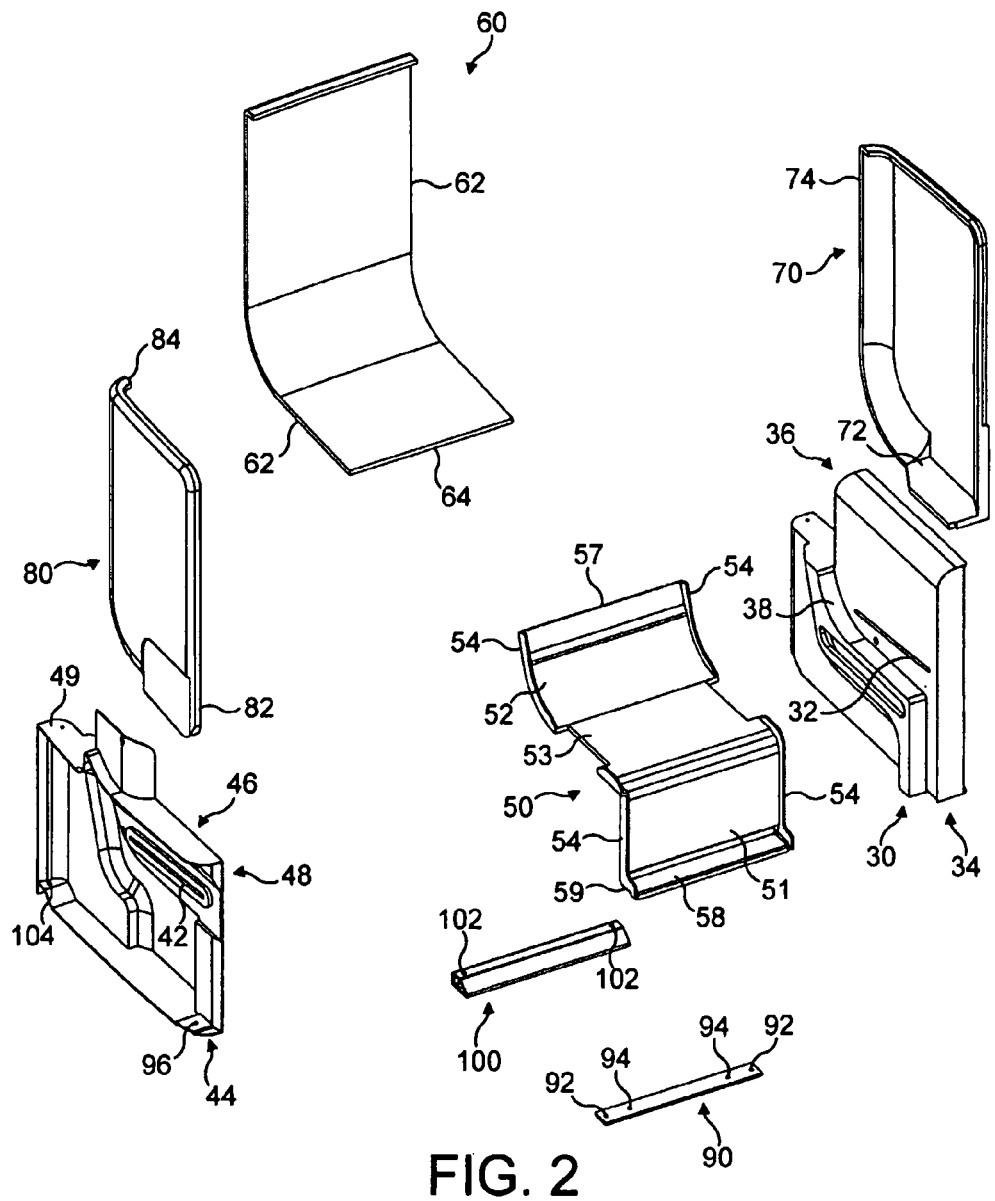
FIG. 2 is an exploded perspective view of a structural frame of the seat in FIG. 1.
Figure 3A:
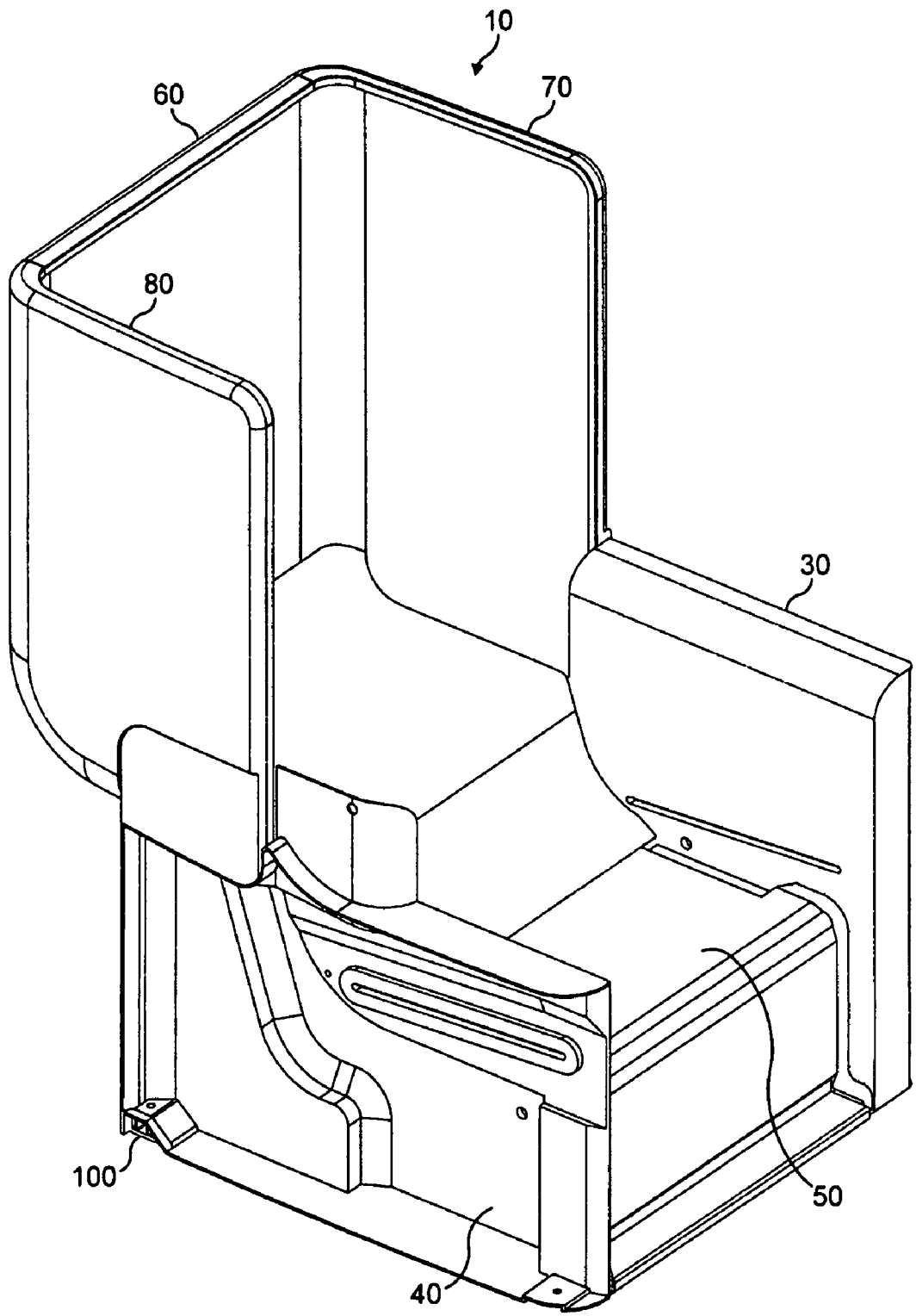
FIGS. 3A and B are perspective views of the assembled structural frame of FIG. 2.

The structural frame that supports the seat of FIG. 1 is now described with reference to FIGS. 2 and 3A and B, whereby the direction which is substantially perpendicular to the aircraft floor on which the seat rests is referred to as vertical, the direction along arm rest 16 is referred to as the longitudinal direction and the direction across seat base 20, perpendicular to the vertical and lateral direction is referred to as longitudinal. The notional plane of the aircraft floor or ground is referred to as horizontal.

The structural frame comprises load bearing side members 30 and 40, each having a slot 32, 42 which is situated approximately halfway between the bottom 34, 44 and the top 36, 46 (acting as a base for arm rest 16) of each side member. Slots 32 and 42 are arranged, when the structural frame is assembled, to act as a guide and locator in which the parts of the seat ride. It is understood that slots 32 and 42 can be replaced by any other suitable means for securing a seat for continuous movement between a first and second position, for example a ledge. Side members 30, 40 further comprise protrusions forming horizontal ledges 38, 48 extending transversally which provide a connecting surface for bonding to a cross member 50, which spaces side members 30 and 40.

The cross member 50 comprises a plate extending transversely between side member 30 and 40 and defines an S-shaped profile in the longitudinal/vertical plane. The cross member 50 thus comprises two surfaces 51 and 52 respectively extending vertically in the downwards direction and upwardly at an intermediate angle, and a horizontal surface 53 extending laterally and longitudinally and generally parallel beneath the seat base 20.

The side and cross members (30, 40, 50) hence define a hollow box section of four sides between them. It is understood that the box section may have more than four sides (e.g. being closed at the bottom) and that the angles between the sides are not limited to be rectangular and may be rounded over a region of the box section.

Cross member 50 further comprises vertical surfaces 54 situated at the lateral edges. The vertical surfaces 54 provide a further surface for bonding cross member 50 to the ledges 38, 48 on the side members 30 and 40. A further front lip 58 is formed at the lower end of cross member 50 which, in-cooperation with lower ends 34 and 44 of side members 30 and 40, forms part of the overall surface of the structural frame that rests on the aircraft floor when the seat is installed. The lip 58 comprises a downwardly facing recess 59 for accepting a track fixing interface or ground engaging member 90 for fixing the seat to the aircraft floor. Member 90 comprises a first set of holes 92 for bolting it to corresponding holes 96 in side members 30 and 40 and a second set of holes 94 for bolting it to the aircraft floor. A further track fixing member 100 is situated towards the rear of the seat assembly. It also comprises a first set of holes 102 for bolting member 100 to corresponding holes 104 towards the rear in side members 30 and 40 and a second set of holes for fixing to the aircraft floor (not shown).

Side members 30 and 40 comprise a further rear horizontal surface 39/49 at the rear end of each of the ledges 30, 40, which act as an interface for bonding backshell 10 to the structural frame assembly. It will be seen from FIG. 2 that the backshell 10 is made up of a back part 60 and two sides 70 and 80.

The corresponding bonding surfaces 72 and 82 on the backshell 10 are formed on the respective sides 70 and 80. Sides 70 and 80 are bonded to back wall 60 along their lateral edges 74, 84 and 62, respectively. In addition, the front edge 64 of the back wall 60 is bonded to the rear edge 57 of cross member 50. Integrally bonding the backshell to the structural frame further contributes to the structural stability of the frame.

Considering side members 30 and 40 and cross member 50 in isolation, a structural frame or support structure for supporting the passenger seat is formed, which supports the passenger seat above a substantially cuboidal structural base defined on four sides by the side members and the cross member and by the floor to which the structure is secured. In this arrangement, the bonding surfaces 54, 38 and 48 form an interface with projections covering substantially all of the longitudinal and vertical extent of side members 30 and 40 underneath the passenger seat (apart from cutout 56 in horizontal surface 53). This extended, elongate interface between side members 30 and 40 and cross member 50 distributes any load onto a much larger surface than, for example, the relatively small interaction surfaces of conventional bolted cross members. Such a structure which is designed to distribute forces allows the use of a much larger range of materials in the construction of the structural frame than previously possible. In particular, fibre-reinforced composite materials can be employed rather than the conventional aerospace grade steel or aluminium machined, pressed or cast members.

The fact that the nature of the interface between the members of the structural frame, described above, distributes load and stress forces evenly across the members compensates for the relatively lower yield stress of, for example, fibre-reinforced composite laminates perpendicular to the plane of the fibres in order to exploit the relatively high yield stress these materials exhibit within this plane. A much lighter structural frame than conventional steel or aluminium frames can thus be constructed by using materials which have high yield stress in the dimensions where it is crucial by compensating for the relatively lower yield stress in other dimensions through design of the frame structure to produce a rigid shape.

The structural frame of the specific embodiment described above with reference to FIGS. 2 and 3A and B is constructed from shaped reinforced fibre composite and honeycomb laminates. Any reinforced fibre composite material may be used, but carbon fibre based composites with a Phenolic Resin matrix have been found to be advantageous in terms of weight saving. Other fibres such as glass, polyamide (e.g. Kevlar, registered trade mark) may also be advantageous. The use of epoxy or polyester matrices is equally envisaged. Any suitable honeycomb may be used to form the laminate, but the specific embodiment uses an aluminium honeycomb core (Aeroweb produced by Cyba-Geigy, registered trade marks).

The laminate parts are bonded together using methacrylate.

In the specific embodiment described above, the backshell 10 is constructed from a laminate of aluminium honeycomb sandwiched between three layers of biaxial carbon fibre composites with a resulting thickness of under 14 mm in this embodiment. The structural frame comprising the side members 30, 40 and cross member 50 is constructed from a laminate of aluminium honeycomb sandwiched between 5 layers of biaxial carbon fibre composite on each side, resulting in a thickness of less than 15 mms in this embodiment. The thicker of the two materials has a density of just under 400 kg/m$^3$, which is substantially less than the density of corresponding aluminium parts which would be in the region of 3000 kg/m$^2$ or even higher for steel parts. Track fixing members 90 and 100 are manufactured as aluminium extrusions having a density of 2800 kg/m$^2$, but do not contribute significantly to the overall weight due to the small volumes involved. The structure described above thus results in significant weight savings as compared with traditional steel or aluminium subframe constructions.

The decorative cladding 18 shown in FIG. 1 may also contribute to the structural stability of the frame. To exploit this, the cladding may be made from structurally sufficiently strong material to add to the overall stability. For example, the cladding may be of the same material as the other parts and may be bonded thereto using a structural adhesive (although any other means of securing the cladding is also envisaged). Thus, a double-skinned construction with added stability is achieved.

Figure 3B:
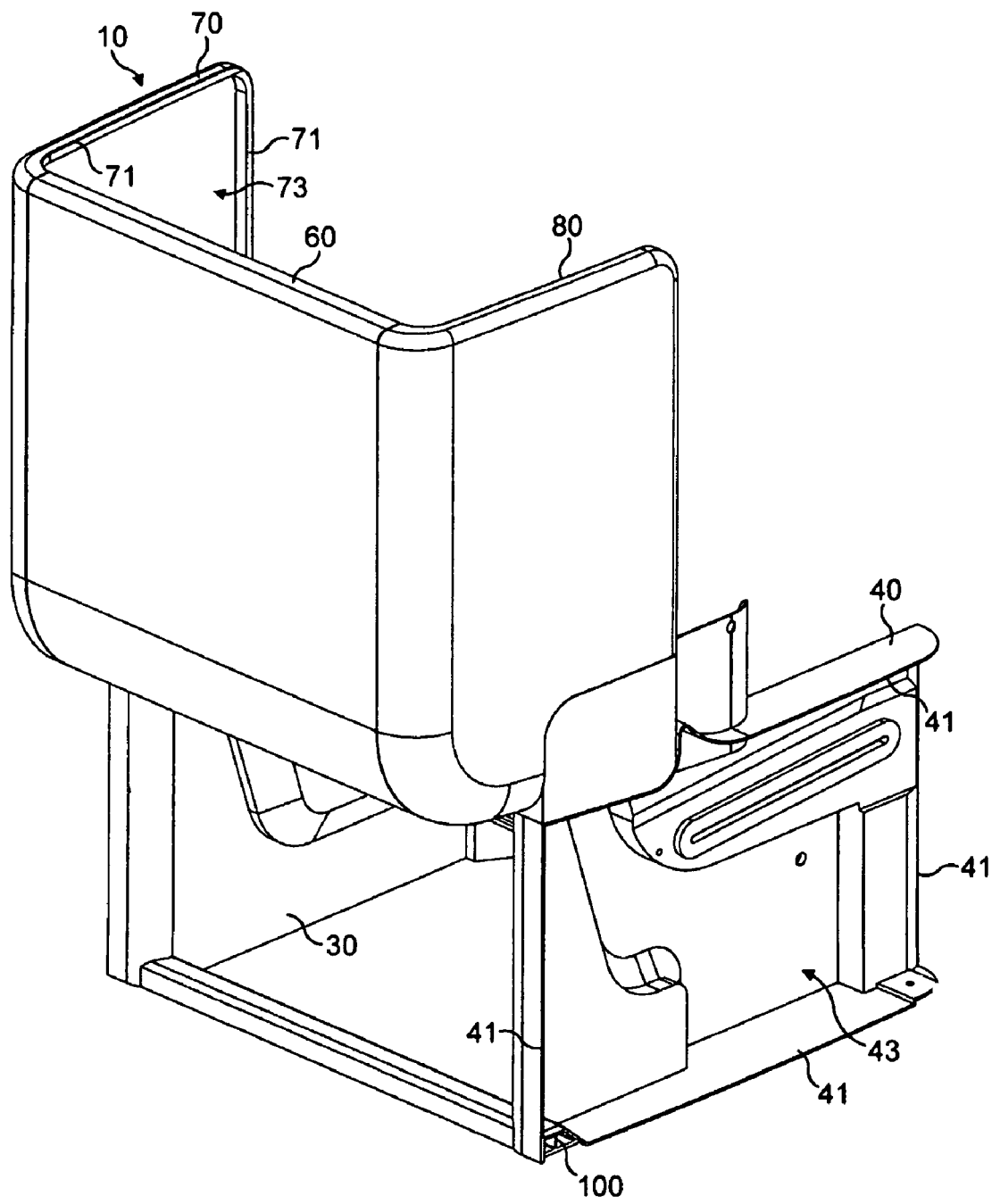

FIG. 3B shows the surfaces of the structural frame to which the cladding may be attached, denoted by 41 for the side members and 71 for the backshell. A cavity 43 is thus defined between the respective cladding and the side member 40 and a cavity 73 is defined between the respective cladding and the backshell 70.

The cavities 73 and 43 can be used to stow and conceal auxiliary equipment and/or accessories of the seat. For example, a suitable video screen such as an LED screen, and/or reading or ambient lights may be installed in cavity 73 (in combination with suitable cut-outs in the backshell 10 or cladding).

Similarly, any electrical circuitry or circuit board can be stowed in the cavity so that it is concealed, and is not exposed to damage.

It is understood that features of the specific embodiment described above may be altered, omitted or juxtaposed without departing from the scope of the intention. For example, the structural frame may be formed as a single laminate structure or the adhesive bonds between laminate parts may be replaced by other securing means.

The embodiment discussed above describes a frame structure for an aircraft seat. It will be apparent to the skilled person that such a frame structure can be employed to construct an aircraft seating unit by providing a passenger seat and other fittings. The specific embodiment described above is meant to illustrate, by way of example only, the invention, which is defined by the wording of the claims set out below.

The invention claimed is:

1. A support structure for an aircraft seat comprising:
   first and second load bearing side members which are spaced from each other,
   each side member including a means for securing a seat and a ground engaging portion, each side member further including a bonding surface which covers generally all of a lateral and vertical extent of the side member beneath the seat;
   a stiffening web extending between the first and second side members, the stiffening web including bonding edges on opposed sides thereof, wherein the stiffening web bonding edges are bonded to respective bonding surfaces of the first and second side members; and
   wherein the first and second side members and the stiffening web cooperate to form a hollow box section of at least four substantially closed sides.

2. A support structure as claimed in claim 1, in which the hollow box section has 4 or 5 sides.

3. A support structure as claimed in claim 1, in which the spaced side members and the stiffening web are substantially made of fibre reinforced composite material.

4. A support structure as claimed in claim 3, wherein the fibre reinforced composite materials comprise a sandwich of layers of carbon fibre reinforced composite with a honeycomb core.

5. A support structure as claimed in claim 1, further comprising ground engaging members;
   wherein the box section extends substantially from the means for securing the seat to the ground engaging members.

6. A support structure as claimed in claim 1, wherein the stiffening web comprises a central portion and front and back portions, the front portion extending towards the ground engaging portion of each side member and the back portion extending towards the means for securing the seat.

7. A support structure as claimed in claim 6 wherein the central portion is generally horizontally oriented and the front portion is generally vertically oriented.

8. A support structure as claimed in claim 1, the support structure further comprising a back shell extending laterally between the side members.

9. A support structure as claimed in claim 8 in which the back shell defines an interior cavity therein.

10. A support structure as claimed in claim 9 in which the interior cavity in the back shell houses auxiliary equipment.

11. A support structure as claimed in claim 1, the means for securing the seat comprising a slot.

12. A support structure as claimed in claim 1 in which at least part of the support structure includes a double-skin construction defining an interior cavity.

13. A support structure as claimed in claim 1 in which the side members define an interior cavity therein.

14. A support structure as claimed in claim 1 in which the stiffening web defines first and second sides of the box section, the second side extending from the first side towards a ground engaging member.

15. A support structure as claimed in claim 1, wherein the means for securing a seat is configured for moving the seat between first and second positions.

16. A support structure as claimed in claim 1, wherein the side members and the stiffening web comprise fibre-reinforced composite materials and an interface between the side members and the stiffening web distributes load and stress generally evenly across the support structure to compensate for a relatively low yield stress of the fibre-reinforced composite laminates in a direction generally perpendicular to a plane of the fibres in the fibre-reinforced composite materials.

17. A support structure as claimed in claim 16, wherein the fibre reinforced composite materials comprise a sandwich of layers of carbon, glass or polyamide fibre reinforced composite with a honeycomb core.

18. A support structure as claimed in claim 17, wherein the honeycomb core comprises aluminum.

* * * * *